Figure 1:
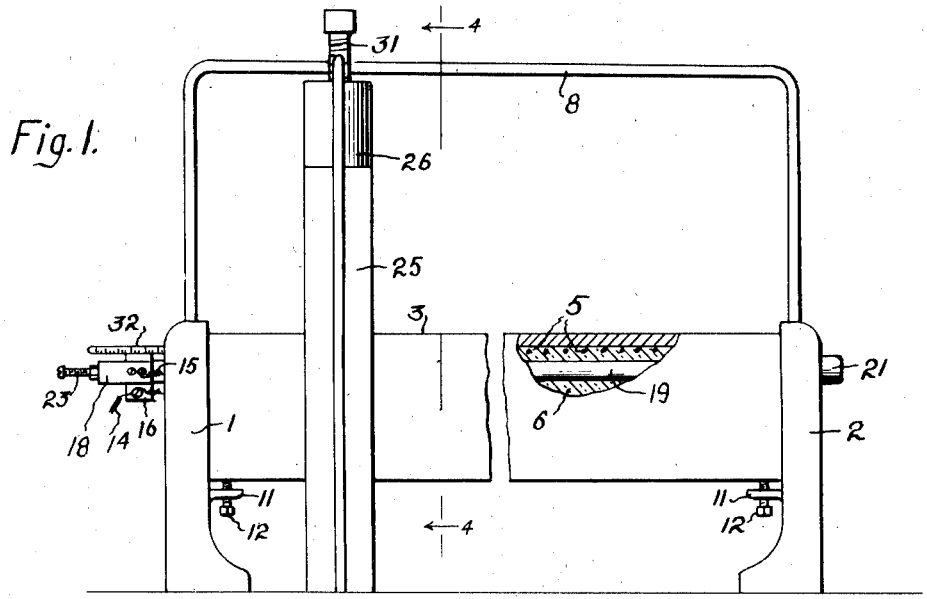

May 17, 1927.

R. A. BROOKS 1,628,766

AUTOMATICALLY CONTROLLED, ELECTRICALLY HEATED VULCANIZING APPARATUS

Original Filed Aug. 8, 1923   3 Sheets-Sheet 1

INVENTOR:
Roscoe A. Brooks,
BY Wm. F. Freudenreich
ATTORNEY.

May 17, 1927. 1,628,766
R. A. BROOKS
AUTOMATICALLY CONTROLLED, ELECTRICALLY HEATED VULCANIZING APPARATUS
Original Filed Aug. 8, 1923   3 Sheets-Sheet 2
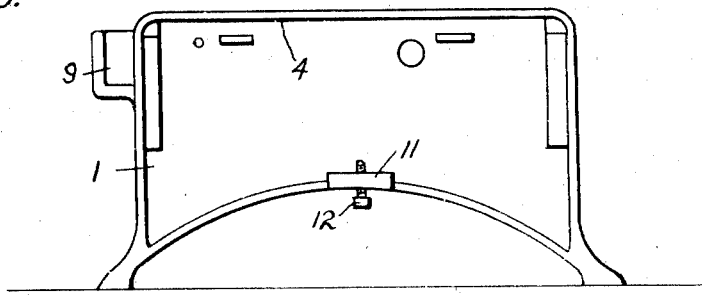
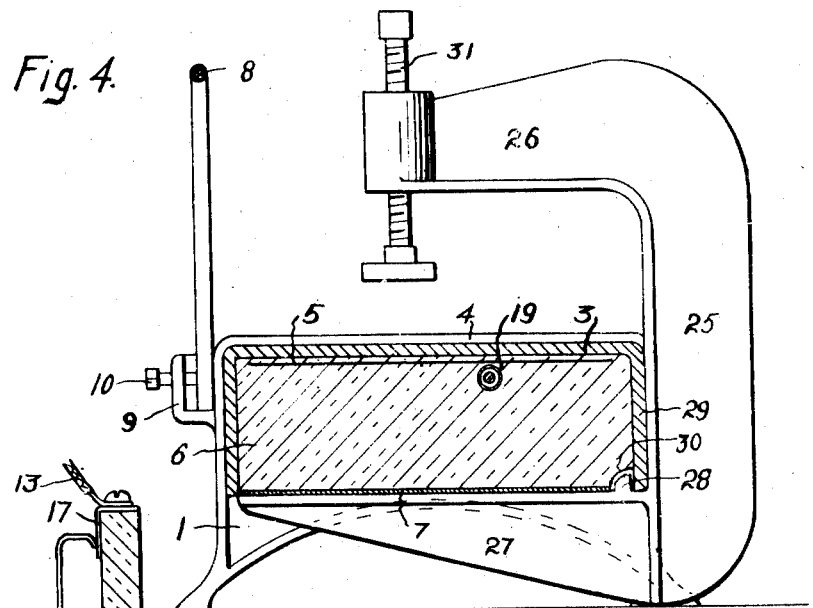
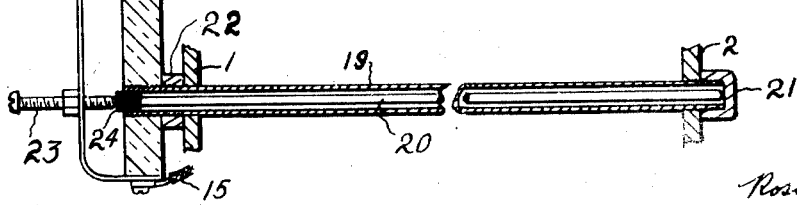
INVENTOR:
Roscoe A. Brooks
BY
Wm F Freudenreich
ATTORNEY.

May 17, 1927.  R. A. BROOKS  1,628,766
AUTOMATICALLY CONTROLLED, ELECTRICALLY HEATED VULCANIZING APPARATUS
Original Filed Aug. 8, 1923  3 Sheets-Sheet 3

INVENTOR:
Roscoe A. Brooks,
BY Wm F Freudenreich
ATTORNEY

Patented May 17, 1927.

1,628,766

UNITED STATES PATENT OFFICE.

ROSCOE A. BROOKS, OF CHICAGO, ILLINOIS, ASSIGNOR TO EDWARD GEORGE MUMFORD AND HENRY B. KRUSE.

AUTOMATICALLY-CONTROLLED, ELECTRICALLY-HEATED VULCANIZING APPARATUS.

Application filed August 8, 1923, Serial No. 656,354. Renewed March 26, 1927.

The appliances most commonly used for retreading tires and repairing inner tubes employ steam as the heating medium, requiring a steam-generating plant and piping to lead the steam to the appliances. Not only is such apparatus expensive and cumbersome and expensive in operation, but great care must be exercised in regulating the temperature so as to keep the vulcanizing apparatus within the proper limits of temperature.

The object of the present invention is to produce a simple and novel vulcanizing apparatus adapted to the uses just mentioned, and other uses, which shall be cheap in construction, occupy but little space, be easy to operate, and which will automatically regulate and control the temperature to which the work is subjected.

In carrying out my invention, I heat the mold or plate by means of an electrical heating element and regulate the temperature by means of a thermostatic switch influenced by the temperature of the apparatus so as to shut off the current when the temperature reaches a predetermined maximum and again turn it on when the temperature drops to a predetermined minimum. In actual practice I have been able to regulate the temperature so as to maintain it practically constant by employing a thermostatic controlling means which is simple and rugged and yet sensitive to small temperature changes.

Viewed in one of its aspects, therefore, my invention may be regarded as having for its object to produce a simple and novel electrically-heated vulcanizing apparatus the working temperature of which is automatically kept within safe limits by a simple and effective themostatic regulator.

I prefer to use as the thermal element of my improved regulator a rod loosely arranged in a tube having a different coefficient of expansion than the rod, the tube and rod being of considerable length so as to produce a considerable movement of one end of the rod relatively to the corresponding end of the tube. This thermal element may therefore conveniently be used as a tie rod or member to secure the parts of a vulcanizing appliance together.

Viewed in another of its aspects, therefore, my invention may be said to have for its object to produce a simple and novel vulcanizing apparatus having a thermostatic temperature regulator in which the thermal element serves as the mechanical fastening device for holding the parts of the apparatus together.

Figure 2:
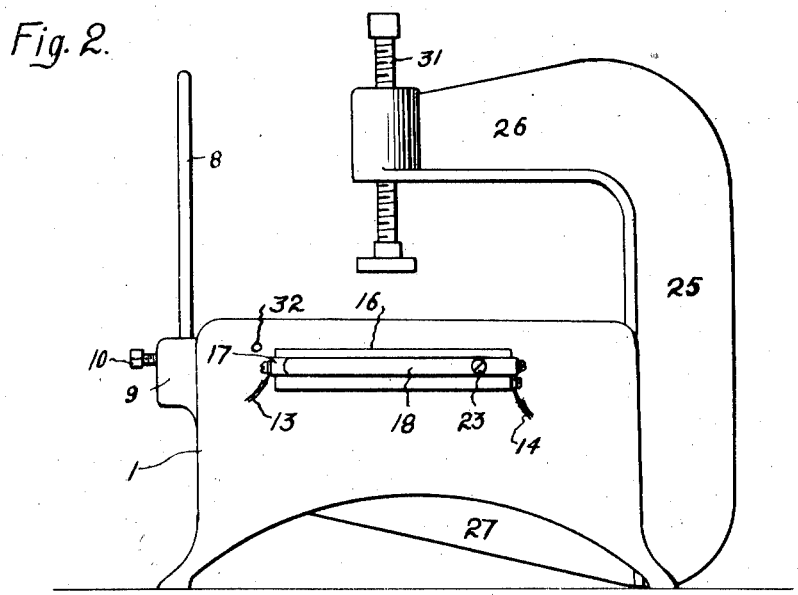
Figure 6:
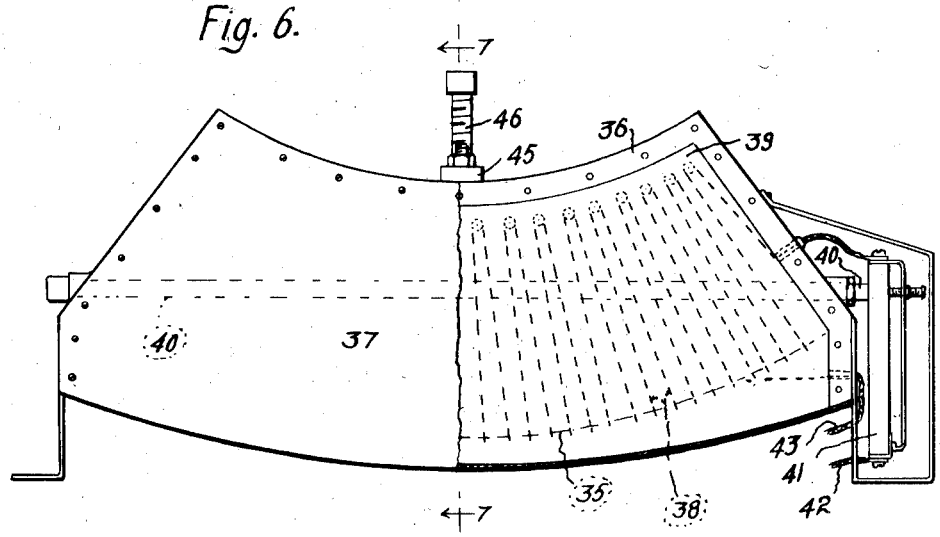
Figure 7:
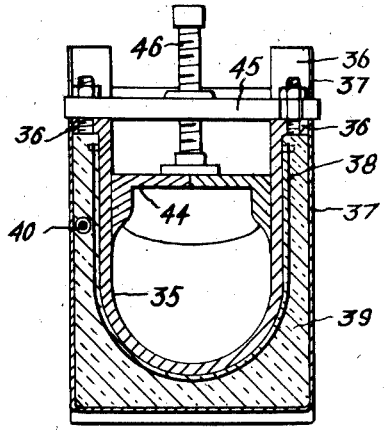

The various features of novelty whereby my invention is characterized will hereinafter be pointed out with particularity in the claims; but for a full understanding of my invention and of its objects and advantages, reference may be had to the following detailed description taken in connection with the accompanying drawings, wherein:

Figure 1 is a front view of a vulcanizing plate arranged in accordance with my invention, a fragment being broken away to show the interior; Fig. 2 is an end view of said vulcanizing plate; Fig. 3 is an elevation showing the inner side of one of the end or frame members; Fig. 4 is a section taken approximately on line 4—4 of Fig. 1; Fig. 5 is a section on an enlarged scale, showing the thermostatic controller or regulator; Fig. 6 is a front elevation of a sectional tire mold arranged in accordance with the present invention, a portion of the cover or casing being broken away; and Fig. 7 is a section taken approximately on line 7—7 of Fig. 6.

Referring to Figs. 1 to 5 of the drawings, 1 and 2 represent end plates or frame members between which is arranged an inverted channel 3. Each end member is preferably provided with an inwardly-directed marginal flange 4 fitting against the flat top and the depending flanges of the member 3. These three elements may be fastened together in any suitable way. The flat top of the member 3 constitutes a vulcanizing plate for vulcanizing inner tubes or other devices. The vulcanizing plate is heated by means of a suitable electrical heater mounted in the trough thereof. In the arrangement shown there is a heating element consisting of a wire 5 extending back and forth a short distance undereneath the flat top of the channel throughout the entire length of the latter; the wire being preferably embedded in a body of insulation 6 that fills the channel. The lower face of the body of insulating material is protected by a plate 7 fitting against the same and closing the mouth of the channel. At the back of the vulcanizer is a rack 8 which may conveniently consist of a U-shaped rod having its ends seated in pockets 9 formed one at the rear edge of each end plate; the rod being held in pockets by means of set screws 10. Each end plate has an inwardly-projecting lug 11 arranged about the middle thereof and a short distance below the vulcanizing plate unit. Set screws 12 extend upwardly through these lugs and engage with the cover plate 7 so as to press the vulcanizing plate unit as a whole upwardly against the overlying flanges on the end plates.

Current for heating the apparatus is supplied to two wires or mains 13 and 14, as best shown in Fig. 2, the wire 14 passing directly to the heating element, while the wire 13 is connected to a switching device which in turn is connected to the heating element by means of a wire 15, as shown in Fig. 1. The switch, as best shown in Fig. 5, may consist of a block 16 of insulating material having at one end a stationary contact piece 17 connected to the main 13, together with a movable contact finger 18 electrically connected with the conductor 15. When the contact piece 17 and the finger are in engagement with each other, the circuit through the heating element of the vulcanizer is completed while, upon the separation of the contact and the finger from each other, the circuit is interrupted.

In accordance with my invention, the movable member of the switch is controlled by the temperature of the apparatus; the switch being opened when the temperature rises to a predetermined maximum, and being again closed when the temperature drops to a predetermined minimum. The thermal element may conveniently consist of a tube 19 within which is loosely arranged a rod 20 having a different co-efficient of expansion than the tube. This thermal element preferably extends throughout the length of the device and it may therefore conveniently extend through the end plates 1 and 2 and serve as a tie rod for drawing the latter against the ends of the channel-shaped plate; there being on one end of the tube a nut 21 in the shape of a cap bearing against the outer side of the end plate 2, and there being on the other end of the tube a nut 22 that bears against the outer face of the end plate 1. The tube is continued outwardly beyond the nut 22, the projecting end serving as a support for the switch, conveniently by being screw-threaded into and passing through the base or body member of the switch. The movable member of the switch is provided with a screw 23 extending through the same in alignment with the rod within the tube. One end of the rod abuts against the cap 21, while on the opposite end is a button or head 24 of insulating material that engages with the screw 23. It will be seen that when the tube and the rod are heated above ordinary room temperature, the rod being made of a material that will expand more rapidly than that of which the tube is made, under a rise in temperature, the insulated head of the rod will move outwardly relatively to the tube, carrying the screw 23 with it, and opening the switch. The parts are so proportioned and the screw is so adjusted that the switch will not be opened until a predetermined maximum of temperature has been reached. As soon as the switch is opened and current ceases to flow through the heating element, the apparatus begins to cool, and therefore the rod member of the thermal element will contract more rapidly than the tube, and the switch will again close and cause current to be supplied to the heating element when the temperature has dropped to a predetermined minimum.

The work must be clamped on the vulcanizing plate, and a further feature of my invention consists of a simple and novel clamping device for this purpose. The clamp is roughly C-shaped, consisting of an upright member 25 having at the top an arm 26 overhanging the vulcanizing plate and at the bottom an arm 27 underlying and engaging with the cover plate 7. The parts are so proportioned that the heel of the clamp will rest on and be supported by the same flat surface that supports the vulcanizer, so that after the clamp has been placed in position it will remain there until moved, without requiring the use of fastening means to hold it in place while the work is being placed in position or removed. In order to prevent the accidental withdrawal or displacement of the clamp in the direction of the length of its arms, I provide the lower arm with a projecting lug 28 on its upper side in position to overlap the inner marginal portion of the front flange 29 of the channel-shaped plate, in the vicinity of the lower edge of the latter. The cover plate 7 and the body of insulating material are both cut away to form a channel or groove 30 extending lengthwise of the vulcanizing plate element and provide a clearance for the lug on the clamp, so that the clamp may be moved freely in the direction of the length of the apparatus.

The free end of the upper arm of the clamp is provided with a suitable screw 31 arranged at right angles to the plane of the vulcanizing plate, for the purpose of engaging with the work on the plate and pressing it down upon the latter.

A thermometer 32 may be attached to the apparatus to indicate the temperature of the vulcanizing plate, so as to permit the initial adjustment of the regulator or controller and to enable the user to ascertain at any time whether proper regulation or control is being secured.

In Figs. 6 and 7 I have illustrated my invention as applied to a sectional mold adapted to vulcanize a tire or a tread of a tire, a segment at a time. The mold 35 may be of any usual or suitable construction. In the arrangement shown, it is provided at the top with outwardly-projecting flanges 36, 36, one on each side. The mold is housed in a box or casing 37 extending underneath the same and secured at the top to the flanges 36. In the space between the exterior of the mold and the surrounding casing is a suitable electrical heater consisting of a wire 38 zigzagging from one end of the mold to the other down one side, underneath the mold, and up the other side. The free space between the mold and the casing is preferably filled with insulating material, as indicated at 39, the same being conveniently poured into the casing in a plastic condition.

Extending lengthwise through the space between the mold and the housing is the thermal element 40 of the thermostatic regulator or controller, similar to that heretofore described; there being a switch 41 supported on one end of this thermal element and being adapted to make and break the action between one of the leading-in wires 42 and 43 and the heating element for the mold, the other leading-in wire being connected directly to said heating element. In this arrangement, as in the other, the temperature of the mold will be automatically regulated through the opening and closing of the energizing circuit at the limits between which the temperature of the apparatus may be permitted to fluctuate.

The mold shown in the drawings is provided with bead mold elements 44, a detachable clamping bar 45 and a clamping screw or post 46 passing through the bar; all of these elements being of any usual or suitable construction and forming no part of the present invention.

It will thus be seen that I have produced a simple and novel electrically heated apparatus which is cheap in construction, occupies but little space, requires no auxiliary apparatus such as has heretofore been utilized to supply steam, and in which the temperature will be automatically regulated in such a manner that the apparatus can never become too hot or too cold.

While I have illustrated and described with particularity only two simple forms of my invention, I do not desire to be limited to the exact structural details thus illustrated and described; but intend to cover all forms and arrangements which come within the terms employed in the definitions of my invention constituting the appended claims.

I claim:

1. A vulcanizing apparatus comprising a plate in the shape of an inverted channel, a body of insulating material fixed in and filling said channel, a heating element embodied in said body of insulating material, a thermostatic device embodied in said insulating material and projecting therefrom at opposite ends of the channel, two end plates fitted against the ends of said channel, and nuts on the ends of said thermostatic device clamping the end plates against the ends of said channel.

2. A vulcanizing apparatus comprising two end plates, a plate in the form of an inverted channel extending lengthwise between the upper ends of said plates, means for securing the aforesaid plates together, a heater in said channel, a C-shaped clamp having one arm arranged beneath the channel-shaped plate and the other extending transversely above the top of the same, the lower portion of said clamp being of such a size and shape as to cause the clamp to be supported in engagement with the under side of said channel-shaped plate by a flat surface on which said end plates rest.

3. A vulcanizing apparatus comprising two end plates, a plate in the form of an inverted channel extending lengthwise between the upper ends of said plates, means for securing the aforesaid plates together, a heater in said channel, a C-shaped clamp having one arm arranged beneath the channel-shaped plate and the other extending transversely above the top of the same, the lower portion of said clamp being of such a size and shape as to cause the clamp to be supported in engagement with the under side of said channel-shaped plate by a flat surface on which said end plates rest, and a lug on the upper side of the lower arm of the clamp in position to overlap the inner marginal portion of one of the flanges of the channel-shaped plate.

4. A vulcanizing apparatus comprising two end plates, a plate in the form of an inverted channel extending between said end plates, an electrical heater arranged within said channel, a thermostatically controlled switch for said heater, the thermal element of said switch including a tubular member extending lengthwise through said channel and serving as a tie rod to fasten the aforesaid three plates together.

5. A vulcanizing apparatus comprising two end plates and a plate in the form of an inverted channel extending lengthwise between said end plates, a tubular tie member extending through the trough of the channel and through said end plates, a nut in the form of a cap on one end of said tie member, a nut on the opposite end of the tie member engaged with the corresponding end plate, a rod having a different coefficient of expansion than the tie member and extending through the same, and a switch controlled by said rod.

In testimony whereof, I sign this specification.

ROSCOE A. BROOKS.